No. 718,380. PATENTED JAN. 13, 1903.
C. M. PATTERSON.
SUBIRRIGATING DEVICE.
APPLICATION FILED MAR. 23, 1901. RENEWED MAY 10, 1902.
NO MODEL.
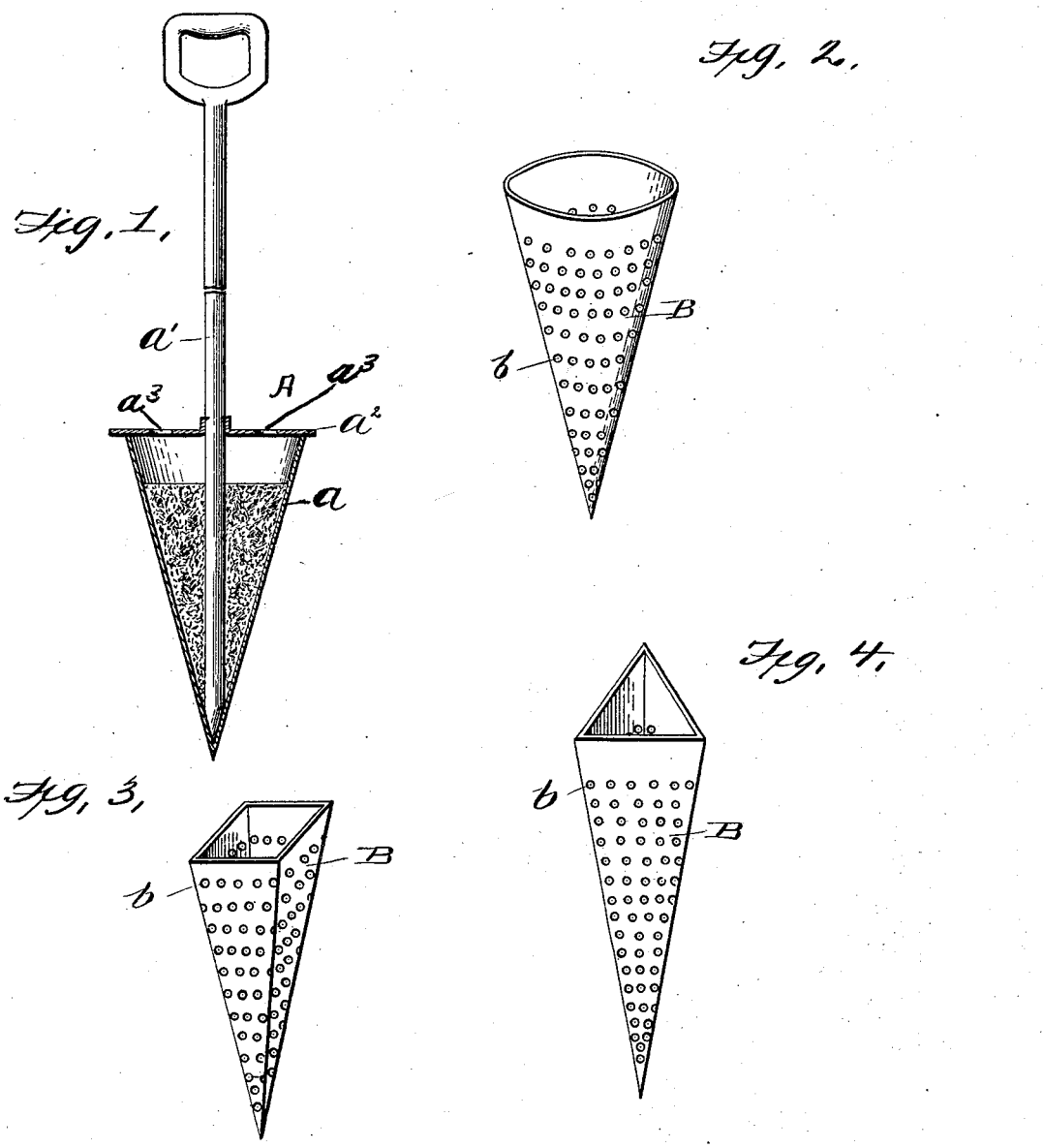

UNITED STATES PATENT OFFICE.

CHARLES M. PATTERSON, OF SHREWSBURY, NEW JERSEY.

SUBIRRIGATING DEVICE.

SPECIFICATION forming part of Letters Patent No. 718,380, dated January 13, 1903.

Application filed March 23, 1901. Renewed May 10, 1902. Serial No. 106,763. (No model.)

*To all whom it may concern:*

Be it known that I, CHARLES M. PATTERSON, a citizen of the United States, residing at Shrewsbury, in the county of Monmouth and State of New Jersey, have invented certain new and useful Improvements in Subirrigating Devices; and I do hereby declare the following to be a full, clear, and exact description of the invention, such as will enable others skilled in the art to which it appertains to make and use the same.

My invention relates in general to subirrigation, but more particularly to a novelly-constructed percolator for supplying the roots of plants, vines, shrubs, and trees with water or liquid fertilizer; and it consists, essentially, of a suitable tool for making a depression in the soil and a perforated shell, preferably of a destructible material, adapted to be inserted in such depression and receive the water or liquid fertilizer and distribute the same to the roots of the plants or other vegetation.

The usual method of watering plants and vines is to apply the water directly to the surface of the soil around the stem of the plant or vine, leaving it to percolate to the roots. This method is highly objectionable in that the water is generally absorbed by the dry earth or evaporates before reaching the roots. A large percentage of yearly vegetation dies for want of water or fails to produce perfect fruit of its kind, and one of the objects of my invention is to prevent such loss.

Another object of the invention is to advance the growth of the plants and vines and the fruit thereof.

These objects are accomplished by means of the device illustrated in the drawings, in which—

Figure 1 illustrates a vertical section of one form of specially-devised tool for making the depression in the soil; Fig. 2, a perspective view of the preferred form of percolator, and Figs. 3 and 4 similar views of modified forms of percolators.

In the several views the letter A indicates the tool or implement for making the depression or hole in the soil. This tool is composed of an inserter $a$, provided with a suitable handle $a'$, as shown in Fig. 1. The inserter may be constructed of any suitable material and of such shape as will render it of easy and rapid insertion into the earth; but I prefer to construct it of metal and in the form of a hollow cone, with openings $a^3$ in the top or cover $a^2$. In case the tool should be found to be too light for making impressions in some soils it may be weighted, as shown in Fig. 1, by partly filling the inserter with a mixture of cement, sand, and water, which may be poured through the openings in the cover and left to set or harden. If it is found necessary to further weight the tool, sand may be poured through the openings in said top to fill the remaining space in the inserter.

The letter B indicates a percolator, which consists, preferably, of a cornucopia-shaped shell provided with a series of perforations or apertures $b$. The percolator may be made of any suitable perishable material, such as paper, the object being to provide a percolator constructed of such a material as will not necessitate its removal in reworking the soil. The shape of the percolator may be varied, having four flat sides, as shown in Fig. 3, or three flat sides, as shown in Fig. 4, with perforations or apertures on one or more sides.

In practicing my invention a depression or hole is made in the soil with the tool and a percolator inserted therein. Water may then be poured into the percolator, which filtering through the perforations irrigates the soil about the roots of the plants or vines. When it is desired to enrich the soil, liquid fertilizer is poured into the percolators and allowed to filter therethrough into the soil.

By the use of my irrigating device vegetation may be advanced and its life protected from injury or death on account of drought at a comparatively small cost, and hardening or baking of the surface of the soil is avoided and the scalding of some plants, as is often the case in surface irrigation, prevented.

Another and important object attained by the use of the percolating-cone is drainage in its immediate vicinity of any surplus water in the event of excessive moisture or water in the soil, especially in clay loam. The water will collect and remain in the percolators until the soil is able to absorb the surplus, and thereby make favorable conditions for plant growth.

Having thus fully described my invention, what I claim as new, and desire to secure by Letters Patent, is—

1. As a new article of manufacture, a percolator for subirrigating purposes consisting of a tapering shell constructed of perishable material, and provided with apertures or perforations, as set forth.

2. A subirrigating device, consisting of a tapering perforated paper shell, said shell being adapted to be inserted into a depression made in the soil, and adapted to receive a supply of liquids for irrigating and other purposes.

3. A subirrigating device, consisting of a tapering waterproof paper shell provided with perforations or apertures, said shell adapted to be inserted into a depression made in the soil, adapted to receive a supply of liquid for irrigating and other purposes.

In testimony whereof I affix my signature in the presence of two witnesses.

CHARLES M. PATTERSON.

Witnesses:
HOWARD A. PATTERSON,
C. IRVING PATTERSON.